US008868386B2

(12) United States Patent
Faatz et al.

(10) Patent No.: US 8,868,386 B2
(45) Date of Patent: Oct. 21, 2014

(54) NAVIGATION IN SIMULATED WORKFLOWS

(75) Inventors: Andreas Faatz, Darmstadt (DE); Eicke Godehardt, Mainz-Kastel (DE); Markus Doehring, Dieburg (DE); Manuel Goertz, Darmstadt (DE)

(73) Assignee: SAP SE, Walldorf (DE)

( * ) Notice: Subject to any disclaimer, the term of this patent is extended or adjusted under 35 U.S.C. 154(b) by 890 days.

(21) Appl. No.: 12/040,704

(22) Filed: Feb. 29, 2008

(65) Prior Publication Data
US 2009/0222817 A1 Sep. 3, 2009

(51) Int. Cl.
G06G 7/48 (2006.01)
G06Q 10/06 (2012.01)

(52) U.S. Cl.
CPC .................. *G06Q 10/06* (2013.01)
USPC ........................................... 703/6

(58) Field of Classification Search
USPC ................................. 703/6; 705/7, 8, 80
See application file for complete search history.

(56) References Cited

U.S. PATENT DOCUMENTS

| 6,611,822 | B1* | 8/2003 | Beams et al. | 706/11 |
|---|---|---|---|---|
| 2004/0083448 | A1* | 4/2004 | Schulz et al. | 717/101 |
| 2005/0209836 | A1* | 9/2005 | Klumpen et al. | 703/10 |
| 2005/0234575 | A1* | 10/2005 | Wu et al. | 700/97 |
| 2005/0256818 | A1* | 11/2005 | Sun et al. | 706/46 |
| 2006/0069599 | A1* | 3/2006 | Hatoun et al. | 705/8 |
| 2006/0074969 | A1* | 4/2006 | Barac et al. | 707/102 |
| 2006/0242002 | A1* | 10/2006 | Sun et al. | 705/11 |

OTHER PUBLICATIONS

'Formal Semantics and Analysis of BPMN Process Models using Petri Nets' [online]. Dijkman et al., 2007 [retrieved on Feb. 14, 2008]. Retrieved from the Internet: <URL: http://eprints.qut.edu.au/archive/00007115/01/7115.pdf>, 30 pages.
'ULTRAflow—A Lightweight Workflow Management System' [online]. Ultraflow, 2008, [retrieved on Feb. 14, 2008]. Retrieved from the Internet: <URL: http://www.ultraflow.de/>, 2 pages.
'Making Work Flow: On the Application of Petri nets to Business Process Management' [online]. van der Aalst, 2002, [retrieved on Feb. 14, 2008]. Retrieved from the Internet: <URL: http://is.tm.tue.nl/staff/wvdaalst/publications/p153.pdf>, 20 pages.
'YAWL—Yet Another Workflow Language' [online]. van der Aalst et al, 2005, [retrieved on Feb. 14, 2008]. Retrieved from the Internet: <URL: http://www.workflowpatterns.com/documentation/documents/yawl_qut_report_FIT-TR-2002-06.pdf>, 37 pages.
'A Tool for Developing Adaptive Electronic Textbooks on WWW' [online]. Brusilovsky et al., 1996, [retrieved on Feb. 14, 2008]. Retrieved on the Internet: <URL: http://www.contrib.andrew.cmu.edu/ ~plb/WebNet96.html>, 7 pages.

(Continued)

*Primary Examiner* — Omar Fernandez Rivas
*Assistant Examiner* — Bernard E Cothran
(74) *Attorney, Agent, or Firm* — Fish & Richardson P.C.

(57) ABSTRACT

An enabled task accessed by a user within a workflow is identified. The workflow is expressed as a Petri net and includes enabled tasks and non-enabled tasks. A non-enabled task selected by a user is identified, and a suitable state that enables the non-enabled state is determined based on the identified enabled task. A simulated workflow for the selected non-enabled task is generated based on the determined suitable state. The simulated workflow is expressed as a Petri net. The user is enabled to navigate through the simulated workflow.

20 Claims, 9 Drawing Sheets

(56) References Cited

OTHER PUBLICATIONS

'Carrying on the e-learning process with a workflow management engine' [online]. Cesarini et al, 2004, [retrieved on Feb. 14, 2008]. Retrieved on the Internet: <URL: http://citeseer.ist.psu.edu/cache/papers/cs/31156/http:zSzzSzwww.elet.polimi.itzSzuploadzSzmongazSzlibzSzsac04.pdf/cesarini04carrying.pdf>, 6 pages.

Deacon et al., "Customising Microsoft Office to develop a tutorial learning environment," *British Journal of Educational Technology* Mar. 2004, 35(2): 1-12.

Kim et al. "A process-driven e-learning content organization model." *Proceedings of the Fourth Annual ACIS International Conference on Computer and Information Science (ICIS'05)*, Washington, DC, USA, 2005, pp. 328-333.

Sowa, "Chapter 4: Processes," in *Knowledge Representation: Logical, Philosophical, and Computational Foundations*, (Brooks/Cole, 2000), pp. 206-254.

'Workflow Management Coalition The workflow reference model' [online]. Hollingsworth, 1995, [retrieved on Feb. 14, 2008]. Retrieved from the Internet: < URL: http://www.wfmc.org/standards/docs/tc003v11.pdf>, 55 pages.

'Semantics, Verification, and Implementation of Workflows with Cancellation Regions and OR-joins' [online]. M. T. Wynn Dissertation, Queensland University of Technology, 2006 [retrieved on Feb. 26, 2008]. Retrieved from the Internet: <URL: http://www.yawl-system.com/documents/MoeWynn_Thesis_FinalVersion.pdf>, 170 pages.

'Using Colored Petri Nets for Conversation Modeling' [online]. Cost et al., 1991, [retrieved on Feb. 29, 2008]. Retrieved from the Internet: <URL: http://citeseer.ist.psu.edu/cache/papers/cs/10856/http:zSzzSzwww.csee.umbc.eduzSz~jklabrouzSzpublicationszSzijcai99acl.pdf/cost99using.pdf>, 15 pages.

'Petri Nets: Properties, Analysis and Applications' [online]. Murata, 1989, [retrieved on Feb. 29, 2008]. Retrieved from the Internet: <URL: http://embedded.eecs.berkeley.edu/research/hsc/class/papers/PetriNets.pdf>, 40 pages.

* cited by examiner

NAVIGATION IN SIMULATED WORKFLOWS

TECHNICAL FIELD

This description relates to generating simulated workflows.

BACKGROUND

Workflows may represent the implementation of processes. Workflows include units of actions or behaviors that may be referred to as tasks. Tasks may be enabled or non-enabled. Generally, information related to a task is accessed only when the task is enabled.

SUMMARY

In one example implementation, a non-enabled task included in an actual workflow is selected. A state of the workflow in which the selected non-enabled task is enabled is determined. A simulated workflow based on the actual workflow is generated, and the simulated workflow has the state in which the selected non-enabled task is enabled.

In one general aspect, an enabled task accessed by a user within a workflow is identified. The workflow is expressed as a Petri net and includes enabled tasks and non-enabled tasks. A non-enabled task selected by a user is identified, and a suitable state that enables the non-enabled state is determined based on the identified enabled task. A simulated workflow for the selected non-enabled task is generated based on the determined suitable state. The simulated workflow is expressed as a Petri net. The user is enabled to navigate through the simulated workflow.

Implementations may include one or more of the following features. For example, determining the suitable state also may include determining more than one suitable state that enables the selected non-enabled task and identifying obligatory tasks from among the non-enabled tasks. The more than one suitable state may be filtered into filtered states, and the filtered states may exclude suitable states that fail to enable at least one obligatory task. An preferred state may be determined from the filtered states, and the suitable state may be equated with the determined preferred state. Identifying an enabled task accessed by a user in a workflow may include identifying a current marking representing a current state of the workflow associated with the enabled task.

In further examples, determining an preferred state may include determining more than one possible preferred state and determining a similarity measure between the current marking and a target marking representing a state of the workflow that enables the selected non-enabled task. The preferred state may be selected from among the more than one possible preferred state based on the determination of the similarity measure. Determining the similarity measure may include determining an intersection between tasks enabled in a state of the workflow represented by the current marking and tasks enabled in a target state of the workflow represented by the target marking. Determining an intersection between tasks enabled based on the current marking and tasks enabled in the target marking may include determining a number of tasks enabled in both the current state and the target state. Determining the similarity measure may include a number of tasks between the enabled task accessed by the user and the selected non-enabled task. More than one possible preferred state may have the same intersection. Determining the similarity measure also may include determining a most recently simulated possible preferred state and selecting the most recently simulated possible preferred state. Selecting the preferred state may include selecting the preferred state at random from among the more than one possible preferred state.

In additional examples, one or more of the enabled tasks and the non-enabled tasks may be associated with context-specific help accessible through the simulated workflow. Enabling the user to navigate through the simulated workflow may include jumping from a non-enabled task to the selected non-enabled task without performing tasks between the enabled task accessed by the user and the selected non-enabled task. The simulated workflow may be displayed in an interface, where the interface enables the user to navigate through the simulated workflow. A second non-enabled task selected by the user in the simulated workflow may be identified, and a second suitable state that enables the non-enabled task may be determined. A second simulated workflow in which the second non-enabled task is enabled may be generated, and the user may be enabled to navigate through the second simulated workflow.

In another general aspect, a computer program product that is tangibly embodied in a machine-readable medium includes instructions that, when read by a machine, operate to cause a data processing apparatus to identify an enabled task accessed by a user within a workflow. The workflow is expressed as a Petri net and including enabled tasks and non-enabled tasks. A non-enabled task selected by a user is identified, and, based on the identified enabled task, a suitable state that enables the non-enabled state is determined. A simulated workflow for the selected non-enabled task based on the determined suitable state is generated, and the simulated workflow is expressed as a Petri net. The user is enabled to navigate through the simulated workflow.

Implementations may include one or more of the following features. The instructions to determine the suitable state may include instructions that cause a data processing apparatus to determine more than one suitable state that enables the selected non-enabled task, identify obligatory tasks from among the non-enabled tasks, filter the more than one suitable states into filtered states, the filtered states excluding suitable states that fail to enable at least one obligatory task, determine an preferred state from the filtered states, and equate the suitable state with the determined preferred state. Identifying an enabled task accessed by a user in a workflow may include identifying a current marking representing a current state of the workflow associated with the enabled task. The instructions to determine the suitable state also may include instructions that cause a data processing apparatus to determine more than one possible preferred state, determine a similarity measure between the current marking and a target marking representing a state of the workflow that enables the selected non-enabled task, and select the preferred state from among the more than one possible preferred state based on the determination of the similarity measure.

In another general aspect, a device includes a processor configured to identify an enabled task accessed by a user within a workflow. The workflow is expressed as a Petri net and including enabled tasks and non-enabled tasks. The processor is also configured to identify a non-enabled task selected by a user, and determine, based on the identified enabled task, a suitable state that enables the non-enabled state, and generate a simulated workflow for the selected non-enabled task based on the determined suitable state. The simulated workflow is expressed as a Petri net. The processor is also configured to enable the user to navigate through the simulated workflow. The device also includes a repository configured to store the identified non-enabled task selected by the user, and transmit the identified non-enabled task selected by the user to the processor.

Implementations may include one or more of the following features. The device also may include an interface generation module configured to display the workflow, and to display the simulated workflow in response to the selection of the non-enabled task.

Implementations of any of the techniques described above may include a method or process, a system, or instructions stored on a computer-readable storage device. The details of particular implementations are set forth in the accompanying drawings and description below. Other features will be apparent from the following description, including the drawings, and the claims.

DETAILED DESCRIPTION

A non-enabled task included in an actual workflow is selected. A state of the workflow in which the selected non-enabled task is enabled is determined. A simulated workflow based on the actual workflow is generated, and the simulated workflow has the state in which the selected non-enabled task is enabled.

Figure 1:
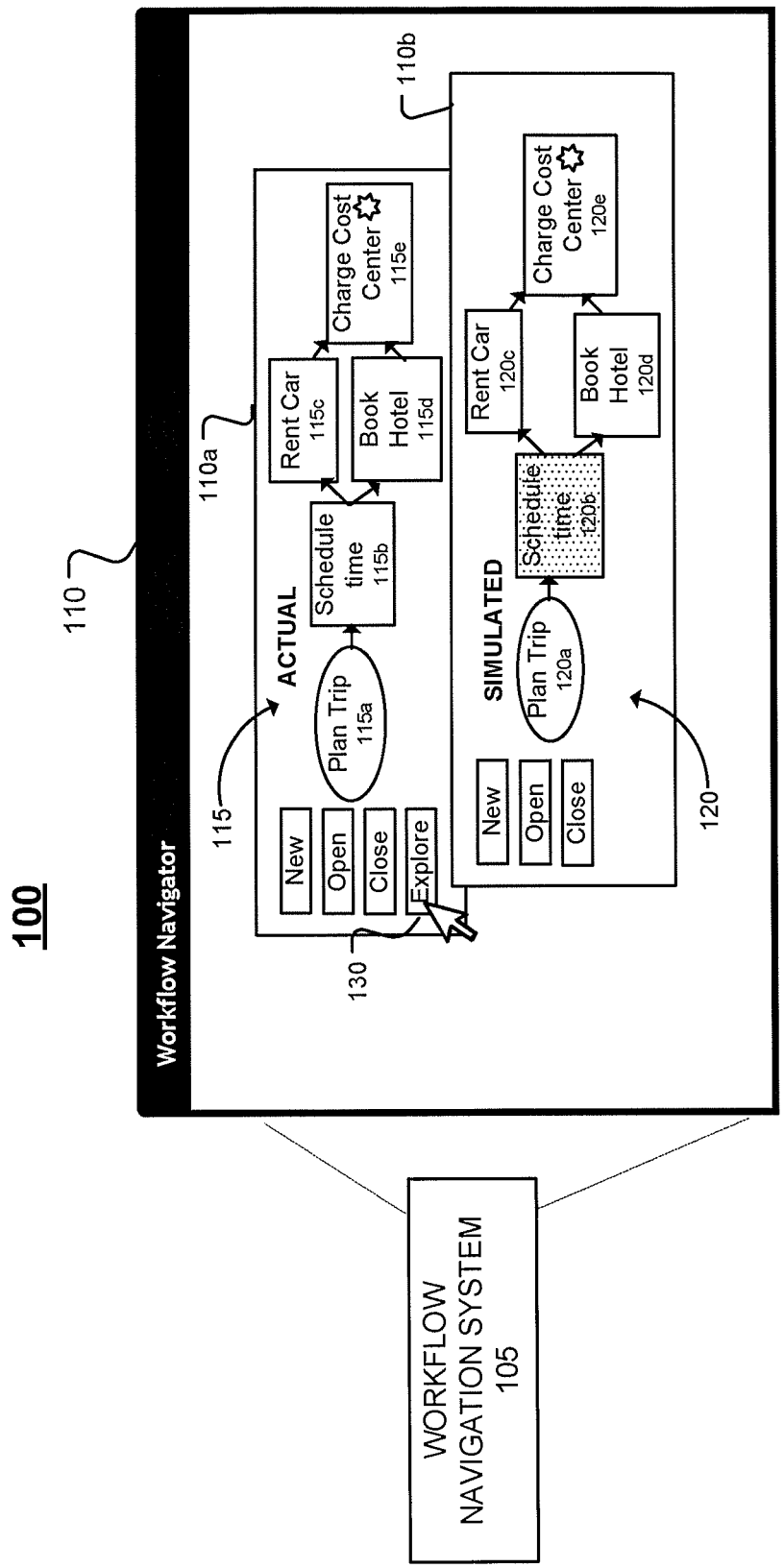
FIGS. 1 and 2 are block diagrams illustrating example systems for navigating in workflows.

Referring to FIG. 1, a system 100 includes a workflow navigation system 105 that generates and displays a user interface 110. The user interface 110 allows navigation through an actual workflow 115 shown in a window 110a. The actual workflow 115 also may be referred to as a workflow 115 in the discussion below. The workflow 115 includes tasks 115a-115e, and each of the tasks 115a-115e may be enabled or non-enabled. The workflow navigation system 105 allows a jump from an enabled task, such as the task 115e, to a task that is not necessarily enabled without having to perform tasks between the enabled task and the non-enabled task. In some examples, the jump from the enabled task to the non-enabled task may be a jump from a first task to a second task that immediately proceeds, immediately follows, or is executed in parallel with the first task. In other examples, the jump from the enabled task to the non-enabled task may be a jump from a first task to a second task, where one or more intervening tasks are between the first and second tasks. The workflow navigation system 105 generates a simulated workflow 120 in a window 110b that has a state in which the selected non-enabled task is enabled. The simulated workflow 120 includes tasks 120a-120e that mirror the tasks 115a-115e included in the workflow 115. The jump from the enabled task to the non-enabled task may occur in the actual workflow 115 and/or the simulated workflow 120. Jumps occurring in the actual workflow 120 result in the user jumping to an otherwise non-enabled task.

In the example shown in FIG. 1, the user has selected to jump to the task 115b. In some implementations, the simulated workflow 120 allows the user to view information associated with the selected non-enabled task, such as context-specific help, information about data to be input to the non-enabled task, and/or information about outputs produced by the non-enabled task. In some implementations, the user may jump to a non-enabled task in the actual workflow 115. In these implementations, the user may actually perform the non-enabled task in addition to viewing context-specific help or other information associated with the non-enabled task. As discussed in more detail below, the workflow navigation system 105 analyzes the workflow 115 and determines one or more states in which the selected non-enabled task is enabled, and the workflow navigation system 105 generates the simulated workflow 120 based on the determined one or more states. The workflow navigation system 105 may determine an preferred state from among the determined states based on a similarity measure that compares the state of the workflow 115 to the determined states.

The workflow 115 is state-based and may be expressed in any workflow language that can be translated to Petri nets. For example, the workflow 115 may be expressed in Yet Another Workflow Language (YAWL) or Business Process Modeling Notation (BPMN). A Petri net includes tokens, transitions, and arcs between places and transitions. The places from which an arc runs may be referred to as input places of the transition, and the places to which an arc runs may be referred to as output places of the transition. Places may include one or more tokens, and a particular distribution of tokens over the Petri net may be referred to as a marking. Transitions act on input tokens through a process that may be referred to as "firing," and a transition is enabled if the transition can fire. In other words, a transition is enabled if the tokens are in every input place. When a transition fires, the transition consumes the tokens from the input places associated with the transition, performs a processing task, and places tokens in the output places associated with the transition.

In the context of a workflow, such as the workflow 115, a task, such as any of the tasks 115a-115e, may be compared to a transition in a Petri net. Tasks may have the firing behavior of Petri net transitions, including the consumption and production of tokens. Thus, a task in a workflow may be considered to be enabled if tokens are in all of the input places of the task. A task may be enabled if the information, material, and/or energy used to complete the task is available, and the existence of a token may be considered to be a representation of the availability of items needed to perform the task.

In the example shown in FIG. 1, task 115e is associated with "Charge Cost Center," and the task 115b is associated with "Schedule Time." However, the tasks 115a-115e included in the workflow 115 may include other activities. For example, the tasks 115a-115e in the workflow 115 may be assigned to any action, such as a manual activity or the performance of a machine-aided or automated action. Manual activities such as the manual initiation of an industrial process may be tasks. In another example, a task may be the performance of a action performed by a machine, such as sending a short message service (SMS). In other examples, a task may be the creation of a list, the creation of a model of the behavior of a system, and/or the description of use cases. A task is performed when the task is fired. A task may fire without a trigger (e.g., the task may fire as soon as the task is enabled), or the task may fire upon the occurrence of an event within a system, such as the pressing of a button. In some examples, the task may fire upon the occurrence of an event external to the system, such as the expiration of a pre-determined amount of time.

Although the workflow 115 relates to a process for planning a trip, in other examples, the workflow 115 may represent any other type of process or activity. For example, the workflow 115 may be a technical implementation of a business process that collectively realizes a business objective or goal within the context of an organization or enterprise. The workflow 115 may represent a manufacturing process used to produce automobiles or consumer goods. The workflow 115 may represent a process in an enterprise for processing invoices and billing customers for services rendered. Thus, although the tasks 115a-115e relate to activities related to planning a trip, in other examples, the tasks 115a-115e may include activities related to any other process represented by the workflow 115.

An enabled task may be the current working task and/or a task for which one or more input tokens are in every input associated with the task. In some implementations, more than one task may be enabled. In some implementations, an enabled task is a task that has been performed. During the normal course of following the workflow 115, the user processes enabled tasks, which may enable new tasks. However, the user interface 110 allows the user to jump to a task that is not necessarily enabled without processing the tasks between the current working task and the selected task. For example, in the example shown in FIG. 1, the task 115e is the current working task, and the task 115e is enabled, but the task 115b is not necessarily enabled. However, the interface 110 generated by the workflow navigation system 105 allows a user to jump from the task 115e to the task 115b without processing the tasks 115c and/or 115d, which are between the enabled task 115e and the task 115b.

The workflow navigation system 105 generates the simulated workflow 120 in response to a selection of a non-enabled task. The simulated workflow 120 includes the tasks 120a-120e that are clones of the tasks 115a-115e included in the workflow 115, but the simulated workflow 120 reflects a state of the workflow in which the selected non-enabled task is enabled. As discussed in more detail below, to generate the simulated workflow 120, the workflow navigation system 105 calculates a state of the workflow in which the selected non-enabled task is enabled.

In the example shown in FIG. 1, the workflow 115 represents a process for planning a trip. Upon receiving a selection of a task to jump to and/or a selection of an "Explore" control 130, the workflow navigation system 105 determines a state in which the "Schedule Time" task 115b is enabled and generates the simulated workflow 120 based on the determined state. For example, the simulated workflow 120 may allow a user who has already planned a trip to view "Schedule Time" task 120b to determine whether the "Schedule Time" task 120b had an option for a reduced price if direct bank account transfer was used for payment rather than a credit card. Such information could be included in a user interface associated with the task 120b, context-specific help associated with the task 120b, and/or a document showing pseudo code associated with the task 120b. As discussed above, the tasks 120a-120e are clones of the tasks 115a-115e, thus information associated with the tasks 120a-120e reflects information associated with the tasks 115a-115e. However, the user does not have to perform the tasks 115c and/or 115d in order to access the information associated with the tasks 115a-115e. In some implementations, the simulated workflow 120 provides informative examination of the workflow 120 as opposed to live-execution of the workflow 115. However, in some implementations, the informative examination of the workflow 120 may include simulated execution.

Although the example shown in FIG. 1 includes a jump from an end of the workflow 115 to a task 115b earlier in the workflow 115, in other examples the jump may be from an earlier task (such as the task 115b) to a task at or near the end of the workflow (such as the task 115e). For example, the current working task may be the task "Schedule Time" 115b, and the selected non-enabled task could be the "Charge Cost Center" 115e task. In this example, the user could view context-specific help associated with the task 115e and/or view the information required to be provided at task 115e (e.g., by previewing an interface associated with the task 115e). For example, the "Charge Center Cost" 115e task may be a process for charging a cost center for the price of the trip planned using the tasks 115a-115e in the workflow 115. The charge to the cost center may be less if the costs of the trip (such as renting a car and booking a hotel) are paid through a direct bank transfer as opposed to being paid through a credit card. Thus, while the current working task is the task "Book Hotel" 115d, the user may jump ahead to the task "Charge Cost Center" 115e prior to making a payment to the hotel to determine which method of payment to use to book the hotel.

Figure 2:
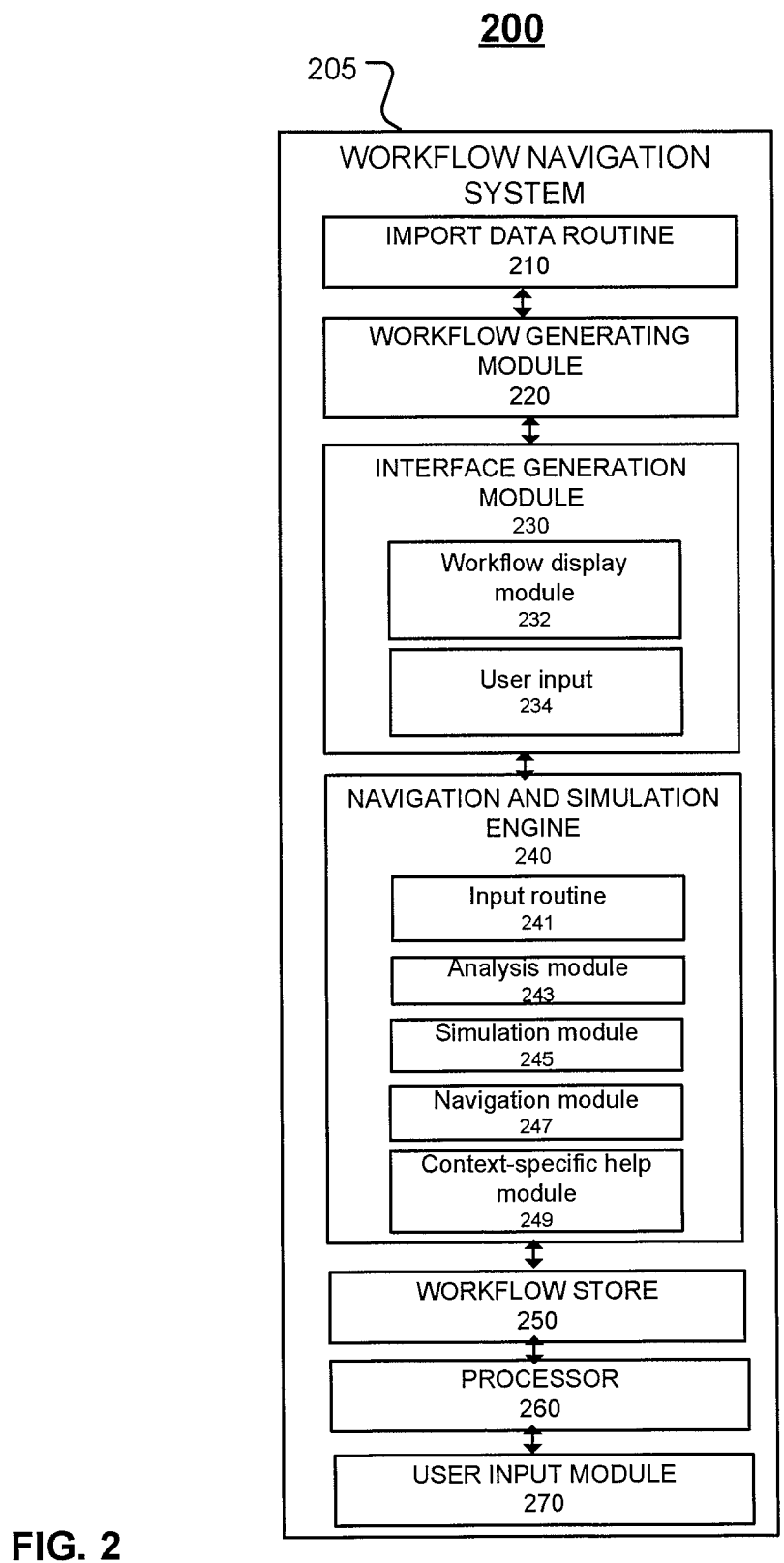

Referring to FIG. 2, a block diagram of a system 200 that includes an example workflow navigation system 205 is shown. The workflow navigation system 200 includes an import data routine 210, a workflow generating module 220, an interface generation module 230, a navigation and simulation engine 240, a workflow store 250, a processor 260, and a user input module 270. The workflow navigation system 205 may be similar to the workflow navigation system 105 discussed above with respect to FIG. 1.

The import data routine 210 imports data needed to generate a workflow such as the workflow 115 discussed above with respect to FIG. 1. The data may include information related to the tasks included in the workflow and relationships among the tasks included in the workflow. The workflow generating module 220 generates a workflow such as the workflow 115 discussed above with respect to FIG. 1. The workflow generating module 220 may use data from the import data routine 210 to generate the workflow. The workflow generated by the workflow generating module 220 may be implemented in any language that may be translated into Petri nets. As discussed above, the workflow can be implemented in, for example, YAWL or BPMN.

The interface generation module 230 includes a workflow display module 232 and a user input 234. The interface generating module 230 generates a user interface that includes a representation of a workflow, such as the user interface 110 discussed above with respect to FIG. 1. The workflow display module 232 displays the representation of the workflow. The representation of the workflow may be a graphical illustration of the workflow. In some implementations, the representation of the workflow may be expressed partially or completely as a textual representation. In some implementations, the tasks included in the representation of the workflow may include symbols, icons, and/or other indicators, of metadata, or other information, associated with the tasks included in the workflow. For example, the tasks may include a note icon, or other symbol, to indicate that the tasks include context-specific help associated with the task. The user input 234 communicates a selection of a task, control, or other item within the representation of the workflow displayed by the workflow display module 232 to the workflow navigation system 205. The user input may be, for example, a selection of a task shown in the representation of the workflow, or the user input may be a selection of a control on the generated user interface, such as the "Explore" control 130 shown in FIG. 1. The user input may be received from a selection made by a mouse, stylus, keyboard, and/or other input/output device. In some implementations, the user input may be received from an automated process performed by a machine.

The workflow navigation system 205 also includes the workflow navigation and simulation engine 240. The navigation and simulation engine 240 analyzes the generated workflow and generates a simulated workflow, such as the simulated workflow 120 discussed above with respect to FIG. 1. The navigation and simulation engine 240 includes an import routine 241, an analysis module 243, a simulation module 245, a navigation module 247, and a context-specific help module 249. In some examples, the import routine 241 imports data from the interface generation module 230 and/or the workflow generating module 220. In these examples, the data may include data representing the generated workflow and data indicating the user's selection of a non-enabled state in the workflow represented by the workflow display module 232. More specifically, the data may include an identifier of the selected non-enabled task and a case identifier that indicates the actual instance of the workflow.

The navigation and simulation engine 240 also includes the analysis module 243, which determines where the selected task is located within the workflow. A process for determining where the selected task is located within the workflow is discussed below with respect to FIG. 5. The analysis module 243 also determines a path from the current task to the selected task and determines a state of the Petri net in which the selected non-enabled task is enabled. The simulation module 245 generates a simulated workflow, such as the simulated workflow 120 discussed above with respect to FIG. 2, based on the determined state. The navigation module 247 receives input indicating a user's selection of a task in the workflow and updates the representation of the workflow to indicate the jump to the previously non-enabled state. For example and referring briefly to FIG. 1, the shading on the task 115b changes in the simulated workflow to indicate that the task 115b has become enabled. In other examples, different or additional indicators may be used to show that a task has become enabled. For example, the border of an enabled task may be bolded and/or the task may be shadowed. The navigation and simulation engine 240 also includes the context-specific help module 249 includes help documentation, or other informative information, that is associated with the tasks included in the workflow. The context-specific help module may include any kind of information technology (IT)-based help system that changes based on the state in which the application associated with the help is in. The state of the system may be the state of the workflow, which determines the enabled and non-enabled tasks. Thus, context-specific help may be available for tasks that are enabled.

The workflow navigation system 205 also includes a workflow store 250. The workflow store 250 may store one or more representations of workflows for later retrieval and display by the interface generation module 230. The workflow store 250 may include workflows generated by the workflow generating module 220 and/or workflows generated separately from the workflow navigation system 200. The workflow store 250 may be, for example, a relational database that logically organizes data into a series of database tables. The data included in the workflow store 250 may be, for example, implementations of one or more workflows in a workflow language such as YAWL or BPMN. Each database table arranges data in a series of columns (where each column represents an attribute of the data stored in the database) and rows (where each row represents attribute values). The workflow store 250 may be, for example, an object-oriented database that logically or physically organizes data into a series of objects. Each object may be associated with a series of attribute values. The work flow store 250 also may be a type of database management system that is not necessarily a relational or object-oriented database. For example, a series of XML (Extensible Mark-up Language) files or documents may be used, where each XML file or document includes attributes and attribute values. Workflows included in the workflow store 250 may be identified by a unique identifier such that a particular workflow may be retrieved from the workflow store 250.

The workflow navigation system 205 also includes the processor 260. The processor 260 may be a processor suitable for the execution of a computer program such as a general or special purpose microprocessor, and any one or more processors of any kind of digital computer. Generally, a processor receives instructions and data from a read-only memory or a random access memory or both. The processor 270 receives instruction and data from the components of the workflow navigation system 205 to, for example, produce and analyze the workflows and display the interface. In some implementations, the workflow navigation system 205 includes more than one processor.

The workflow navigation system 205 also includes the user input module 270, which is configured to allow a user selection. For example, the user input module 270 may be a mouse, a keyboard, a stylus, or any other device that allows a user to input data into the workflow navigation system 205 or otherwise communicate with the workflow navigation system 205, the user input 234, and/or any other component of the workflow navigation system 205. In some implementations, the user may be a machine and the user input may be received from an automated process running on the machine. In other implementations, the user may be a person.

Although the example workflow navigation system 205 is shown as a single integrated component, one or more of the modules and applications included in the workflow navigation system 205 may be implemented separately from the workflow navigation system 205 but in communication with the workflow navigation system. For example, the workflow store 250 may be implemented on a centralized server that communicates and exchanges data with the workflow navigation system 205. In another example, the navigation and simulation engine 240 may be implanted as an application on a system separate from, and in communication with, the workflow navigation system 205.

Figure 3:
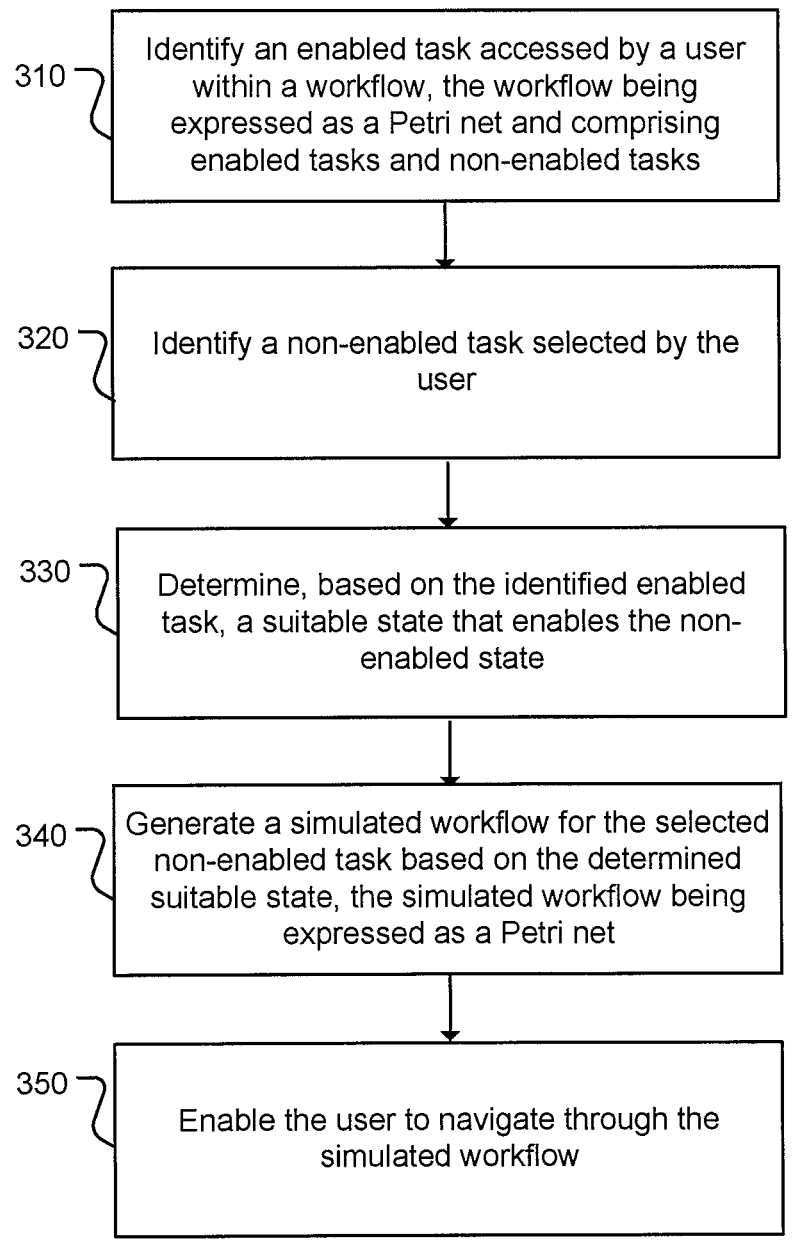
FIG. 3 shows an example process for navigating in a workflow.

Referring to FIG. 3, an example process 300 is illustrated. The example process generates a simulated workflow and enables navigation through the simulated workflow. The example process 300 may be performed by a workflow navigation system such as the workflow navigation system 105 discussed above with respect to FIG. 1 or the workflow navigation system 205 discussed above with respect to FIG. 2. The example process 300 may be performed by one or more processors included in a workflow navigation system such as the workflow navigation system 105 or the workflow navigation system 205.

An enabled task accessed by a user within a workflow is identified (310). The workflow being expressed as a Petri net and the workflow includes enabled and non-enabled tasks. An enabled task may be a task that is the current working task. Referring briefly to FIG. 1, the current working task in the workflow 115 is task "Charge Cost Center" 115e. An enabled task also may be a task for which all of the tokens in all of the input places of the task. A non-enabled task selected by the user is identified (320). The non-enabled task may be selected through a selection of a task shown in a user interface such as the user interface 110. A suitable state that enables the non-enabled state is determined based on the identified enabled state (330). The suitable state may be determined by calculations performed by, for example, the navigation and simulation engine 240 discussed with respect to FIG. 2. A simulated workflow is generated based on the determined suitable state (340). The simulated workflow is expressed as a Petri net. The user is enabled to navigate through the simulated workflow (350). Alternatively or additionally, the user may be enabled to navigate through the workflow.

Figure 4:
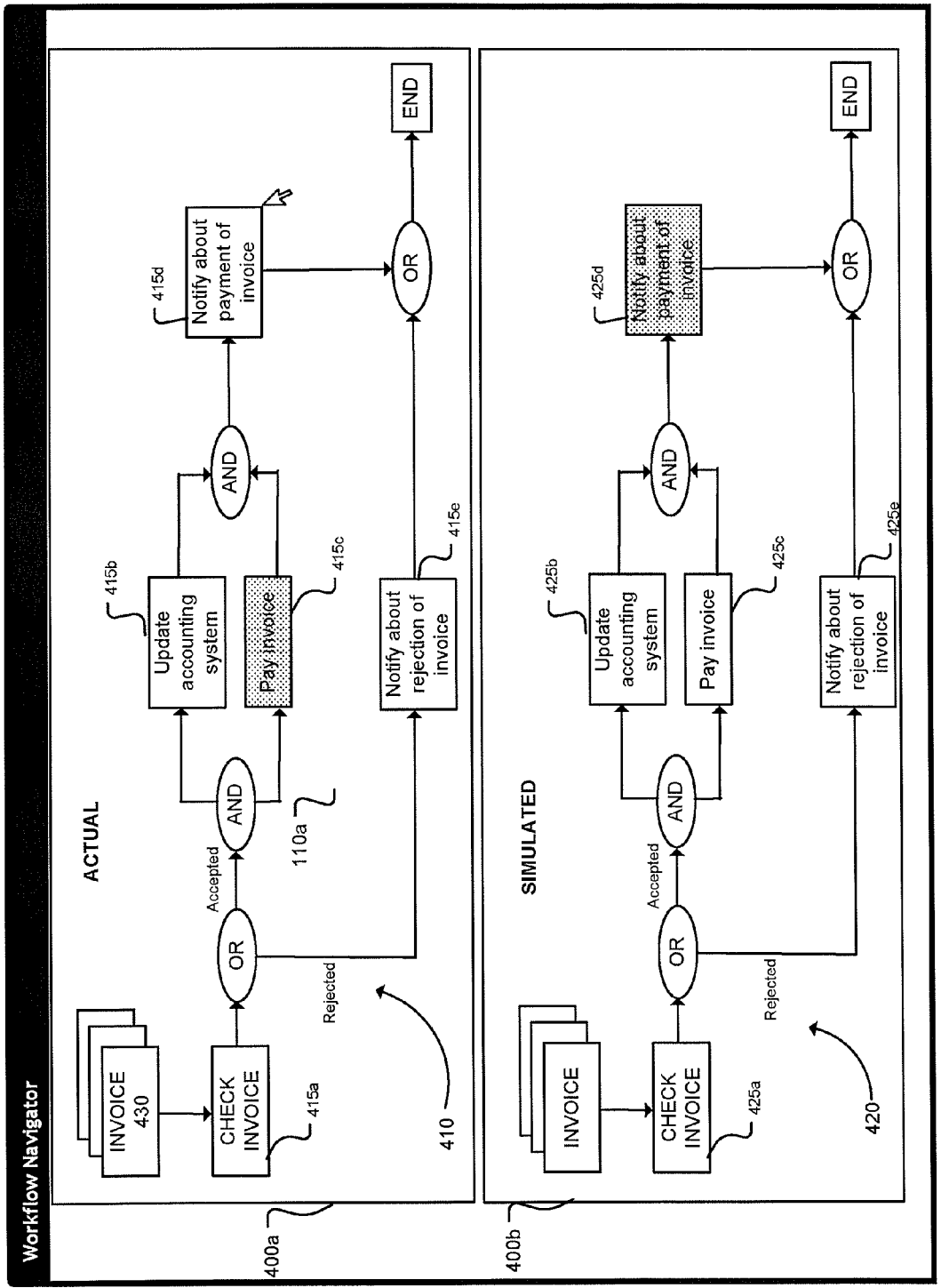
FIG. 4 shows an illustration of an example workflow and a simulated workflow.

Referring to FIG. 4, an example interface 400 displays a workflow 410 in a window 400a and a simulated workflow 420 in a window 400b. The workflow 410 includes tasks 415a-415e, which are tasks used to process invoices 430 for payment or rejection of the invoices 430. The interface 400 may be similar to the interface 110 discussed above with respect to FIG. 1. The interface 400 may be generated by a system similar to the workflow navigation system 105 discussed above with respect to FIG. 1, or the workflow navigation system 205 discussed above with respect to FIG. 2.

The workflow 410 includes both enabled tasks (such as the task "Pay invoice" 415c) and non-enabled tasks (such as the task "Notify about payment of invoice" 415d and "Notify about rejection of invoice" 415e). The workflow 410 also may include context-specific help associated with the tasks 415a-415e. Upon selection of a non-enabled task, the interface 400 displays the simulated workflow 420. The simulated workflow 420 includes tasks 425a-425e, which are clones of the tasks 415a-415e included in the workflow 410, but the simulated workflow 420 represents a state of the workflow 410 in which the task "Notify about payment of invoice" 425d (which corresponds to the task 415d) is enabled. Thus, through the interface 400, the user is able to jump to the non-enabled "Notify about payment of invoice" 415d without having to perform the task "Update accounting system" 415b or the task "Notify about rejection of invoice" 415e. Jumping to the non-enabled task 415d may allow the user to view context-specific help associated with the task 415d, or other information about the task 415d, such as inputs used by the task 415d, actions performed by the task 415d, and/or outputs produced by the task 415d. The simulated workflow 420 results from computations performed by a system such as the workflow navigation system 205.

Figure 5:
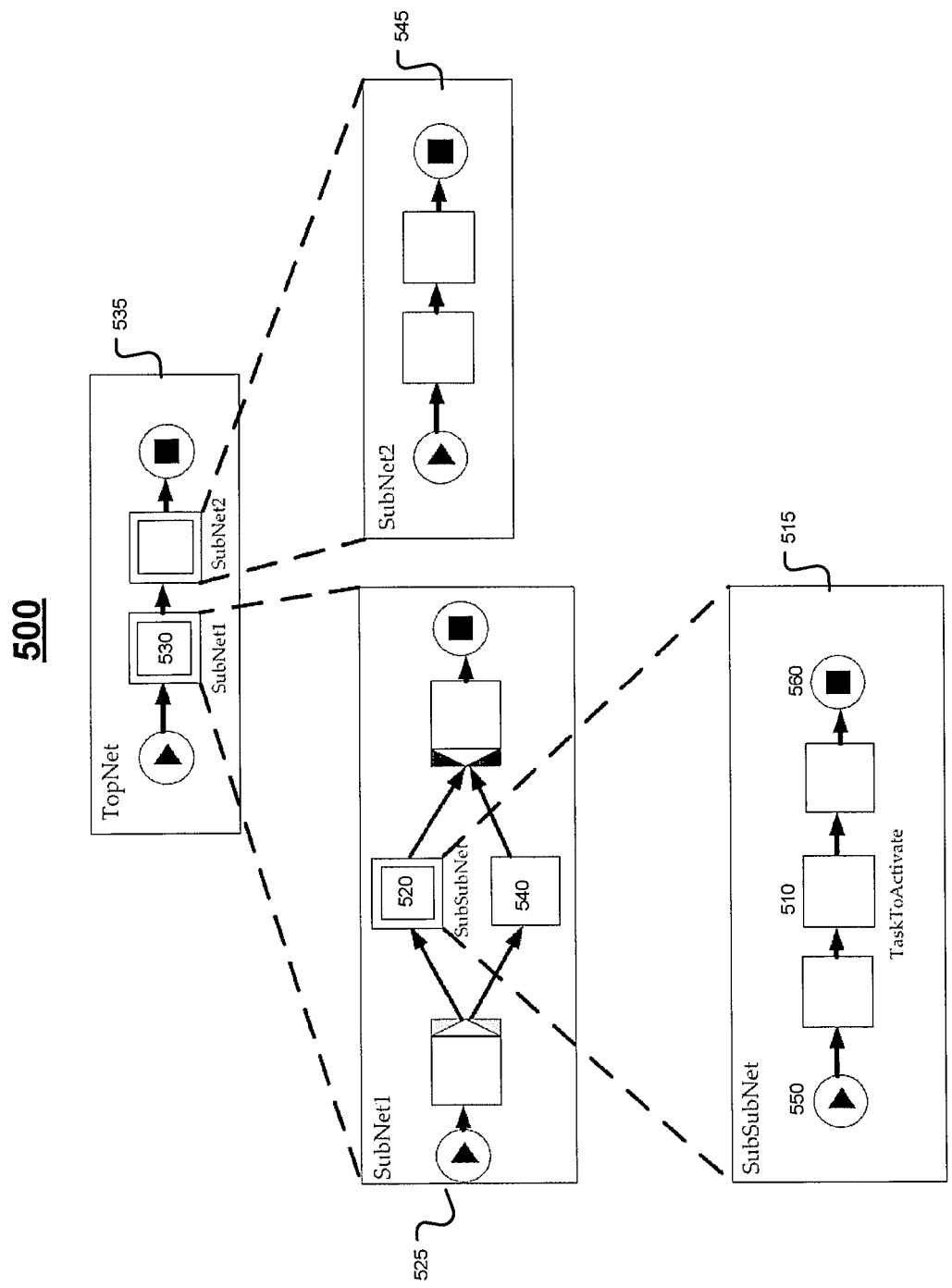
FIG. 5 shows an example of a workflow including composite tasks.

Referring to FIG. 5, a hierarchical YAWL workflow 500 is shown. The workflow 500 is shown to provide an example of allowing a user to jump to a state in a workflow that is not necessarily enabled, and the workflow 500 may be a representation of the workflow 410 discussed above with respect to FIG. 4. The workflow 500 may be generated by a system such as the workflow navigation system 105 or the workflow navigation system 205 discussed above.

Initially, the location within the workflow 500 of the task the user selected to jump to is determined. For example, the selected task to jump to may be to a non-enabled task such as the task "Notify about payment of invoice" 415d. In the example workflow 500 the selected non-enabled task is a task 510 within a subnet "SubSubNet" 515, which is a subnet of a composite task 520. The composite task 520 is a composite task within the subnet "SubNet1" 525. The subnet "SubNet1" 525 itself is part of a composite task 530 within a workflow "TopNet" 535.

In YAWL, a composite task acts as a placeholder for additional, autonomous workflows. A composite task is in contrast to an atomic task, which is a working step that does not define additional, autonomous workflows. Autonomous workflows within the composite tasks also may be referred to as subnets. Thus, in the example shown in FIG. 5, the non-enabled task 510 is nested within the subnet (or workflow) "SubSubNet" 515, which is included within the composite task 520. The composite task 520 is within the subnet (or workflow) "SubNet1" 525, which is part of the composite task 530 within the workflow "TopNet" 535. To enable the selected non-enabled task 510, the composite tasks 520 and 530 also must be enabled. Tasks such as tasks 520 and 530 may be referred to as "obligatory tasks." In contrast, and by way of example, the task 540 is not a composite task; thus, subnets are not associated with the task 540. If the task 540 was selected as the selected non-enabled task to jump to, the subnet "SubSubNet" 515 would not need to be enabled.

To enable the selected non-enabled task 510, a recursive search of the hierarchy of the workflow "TopNet" 535 is performed to determine a state that enables the selected non-enabled task 510. An example of a recursive search is shown in Table 1. The example shown in Table 1 uses an identifier of the selected non-enabled task 510 and an identifier of the workflow currently in process (e.g., workflow "TopNet" 535) as inputs. If the selected non-enabled task 510 may be reached from the workflow currently in process, the recursive search returns a list of succeeding nets. If the selected non-enabled task 510 may not be reached from the workflow currently in process, the recursive search returns an empty list. For each composite task within the currently processed workflow, the search is called. The recursive search continues until a task that is not a composite task (e.g., an atomic task such as the task 540) or a subnet that does not include any composite tasks (e.g., a subnet such as "SubNet2" 545) is reached. For example, the path to the selected non-enabled task 510 shown in FIG. 5 is TopNet 535→SubNet1 525→SubSubNet 515.

TABLE 1

Example Recursive Search

1 PROCEDURE getPathToTask(String taskID , YawlNet startNet) : List
2 {
3 List pathList = null ;
4 YawlNet currentNet = startNet ;
5 if (startNet.getNetElement(taskID) !=null) {
6 //we have reached the recursion peak
7 pathList.add(currentNet) ;
8 return pathList ;
9 }
10 else{
11 <determine composite tasks within current net>
12 if (<no composite tasks present>) return null ;
13 for (<determined composite tasks>) {
14 YawlNet branchNet = <get decomposition net of composite task>) ;
15 //proceed recursion for each potential branch
16 List branchPathList = getPathToTask(taskID , branchNet) ;
17 //returning from recursion peak , assemble result list
18 if ( ( branchPathList!=null) && (branchPathList.size( ) !=0 ) )
19 {
20 pathList.add(currentNet) ;
21 //add parts to be forwarded to upper level recursion calls
22 for (Iterator j = branchPathList . iterator ( ) ; j . hasNext ( ) ; ) {
23 pathList.add(j . next ( ) ) ;
24 }
25 }
26 }
27 }
28 //return assembled list
29 return pathList ;
30 }

The workflows 515, 525, 535, and 545 also each include input conditions and output conditions such as the input condition 550 and the output condition 560 shown with respect to the workflow 515. A condition represents the state of the workflow. A workflow is started if the input condition includes a token, and a workflow is ended if the output condition includes a token. For example, the workflow 515 is started if the input condition 550 includes a token, and the workflow 515 is ended if the output condition 560 includes a token. A workflow also implicitly includes conditions between any two tasks connected by an arc or transition. A task is enabled if the conditions that input to the task each include a token.

Once the location of the selected non-enabled task within the workflow is determined, a state in which the selected non-enabled task is enabled is determined. As discussed with respect to FIGS. 6A and 6B, to generate a simulated workflow that is in a state in which a non-enabled task selected from a workflow is enabled, the allowed states of the workflow are determined. The allowed states are represented by markings, and a single preferred marking is selected from among the markings representing the allowed states of the workflow. Finally, the state of the workflow is transformed from a current state into a state in which the selected non-enabled task is enabled.

Figure 6A:
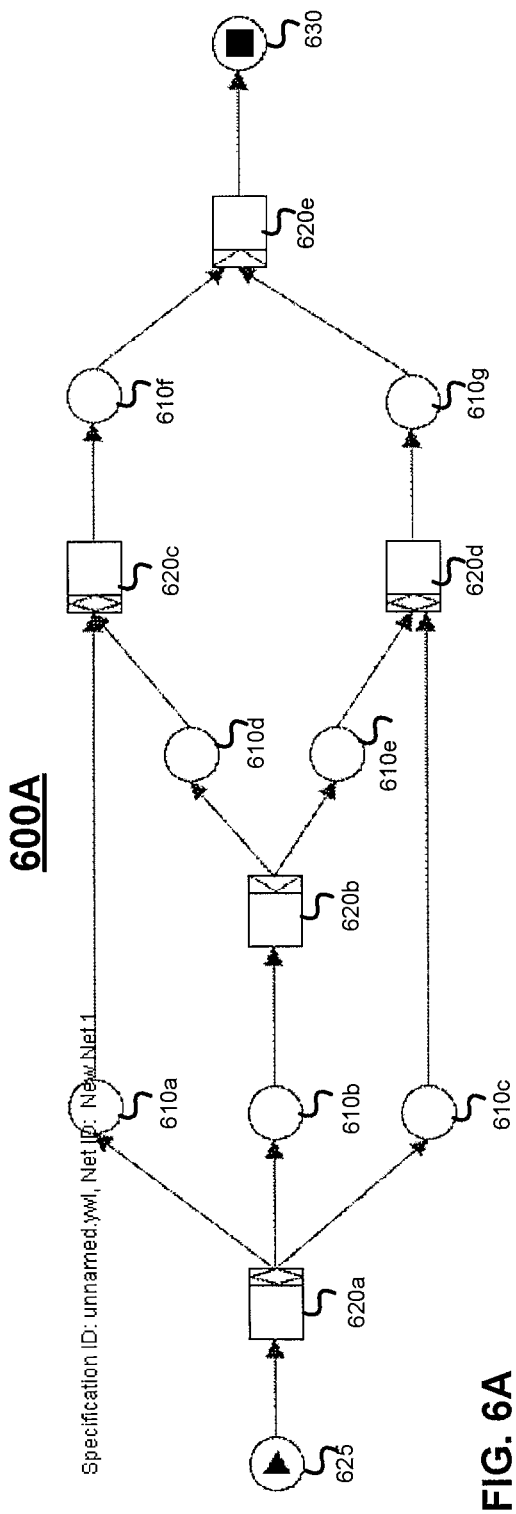
FIG. 6A shows an example representation of a workflow.

Referring to FIG. 6A, "allowed" states of an example YAWL net 600A are determined. The example YAWL net shown in FIG. 6A includes the conditions 610a-610f that are included between tasks 620a-620e of the YAWL net 600A. As indicated by its graphical representation, the task 620a is an "OR-Split" task, the task 620b is an "AND-Split" task, the tasks 620c and 620d are "OR-Join" tasks, and the task 620e is an "AND-Join" task. An "OR-Split" allows arbitrary selection of multiple outgoing branches, an "AND-Split" forks an outgoing stream of control into two threads that are executed in parallel, an "OR-Join" task receives input from several branches and fires when it is no longer possible to add relevant tokens to the set of input conditions to the "OR-Join" task, and an "AND-Join" task synchronized two concurrent threads of control that, when completed, allow the "AND-Join" task to be enabled. Other types of tasks may be included in the workflow, such as an "XOR-Join" task, an "XOR-Split" task, and or a "Cancel" task.

The YAWL net 600A also includes an input condition 625 and an output condition 630. As discussed above, conditions represent the states of a workflow, and conditions inherently exist between two tasks connected by an arc. A workflow starts if an input condition of the workflow includes a token, a workflow is ended if an output condition of the workflow includes a token, and a task is enabled if the input conditions to the task each include a token.

The conditions 610a-610f represent the states of the workflow 600A, and the state of the workflow 600A may be described based on the number of tokens that each of the conditions within 610a-610f include. The number of tokens in each condition may be represented by notation such as "n_condition." For example, {1_610f; 1_610g} indicates that the condition 610f and the condition 610g each include one token. Because the conditions 610f and 610g each include one token, and the conditions 610f and 610g are the input conditions of the task 620e, and the task 620e is an "AND-Join" task (indicating that both input conditions must have a token), the task 620e is enabled. Thus, {1_610f; 1_610g} characterizes the current state of the workflow 600A when the task 620e is enabled and may be referred to as a "marking" of the workflow 600.

Figure 6B:
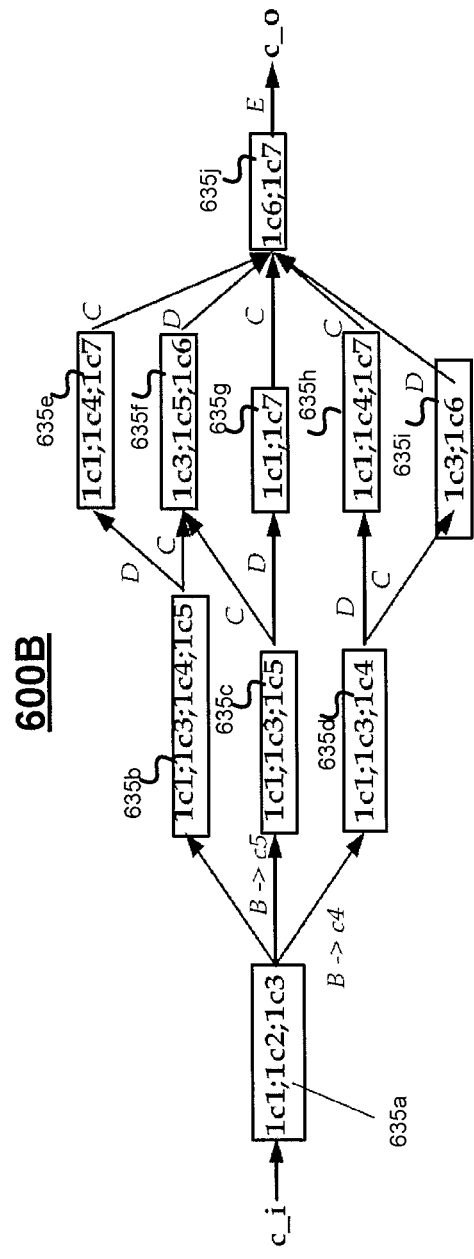
FIG. 6B shows an example representation of a reachability graph for a workflow.

Referring to FIG. 6B, a reachability graph 600B for the net 600A is shown. Markings 635a-635j represent relevant (or reachable) markings for the net 600A. Relevant markings may be those markings that represent a valid state of the net 600A. The relevance (or reachability) of a marking is determined by whether there exists an execution order of the tasks 615a-615e that leads to the marking. For example, the marking 635b represents a state that enables the task 620c. The marking 635b may be represented as {1_610a; 1_610c; 1_610d; 1_610e}. In the example shown in FIG. 6B, the markings 635a-635i are represented with a first number indicating a number of tokens in a condition and a second digit corresponding to a particular condition. For the example shown in FIG. 6B, c1 corresponds to the condition 610a, c2 corresponds to the condition 610b, c3 corresponds to the condition 610c, c4 corresponds to the condition 610d, c5 corresponds to the condition 610e, c6 corresponds to the condition 610f, and c7 corresponds to condition 610g. Thus, the marking 635c also may be represented as {1c1; 1c3; 1c4; 1c5} as shown in FIG. 6B.

A preferred marking representing a state of a net (or workflow) in which a selected non-enabled task is enabled is determined. Markings are filtered to select those markings that represent states in which obligatory tasks are enabled. Referring briefly to FIG. 5 to provide an example of obligatory tasks, to enable the selected non-enabled task 510, the composite tasks "SubSubNet" 520 and "SubNet1" 530 also must be enabled. Thus, the composite tasks 520 and 530, and the selected non-enabled task 510, may be referred to as obligatory tasks. Markings that enable the obligatory tasks are retained and those markings that do not enable the obligatory tasks are filtered out. Referring to FIG. 6A for another example, if a user selects to jump from the task 620e to the "OR-Join" task 620d, only markings that enable the task 620d remain after the filtering. As discussed above, an "OR-Join" task is enabled when there is at least one token in one of several branches input to the "OR-Join" task. Thus, there is a token in the condition 610c and/or the condition 610e when the task 620d is enabled. Accordingly, markings 635b, 635c, 635d, 635f, and 635i are filtered and selected because, as shown in FIG. 6B, each of these markings indicates that at a token is in the condition 610c and/or 610e such that the obligatory task 620d is enabled. The filtered markings 635b, 635c, 635d, 635f, and 635i indicate that tokens are in other conditions as well, but the filtered markings 635b, 635c, 635d, 635f, and 635i all represent states of the workflow 600A in which the obligatory task 620d is enabled. The markings 635b, 635c, 635d, 635f, and 635i also may be referred to as target markings.

If more than one marking is filtered, the filtered markings that are the most similar to the current marking are selected. The state of the workflow when the user selects to jump to a non-enabled task is represented by the current marking. The similarity between the current marking and the filtered markings may be determined from one or more similarity measures that compare the current marking to the filtered markings.

The similarity measures may include determining a size of an intersection of enabled tasks in the current marking and enabled tasks in each of the filtered markings. In other words, the filtered marking that represents a state having the most enabled tasks in common with the state represented by the current marking may be selected. Selecting the filtered markings that are the most similar to the current marking may be referred to as maintaining congruency of enabled tasks. Continuing with the example filtered states determined above, if the task 610c is enabled in the current state (e.g., the state of the workflow 600A just before the user selects a task to which to jump), and the user selects to jump from the task 620e to the task 620d, only those markings that represent states of the workflow 600A in which the tasks 620c and 620d are enabled are retained. Thus, of the filtered markings 635b, 635c, 635d,

635*f*, and 635*i* selected above, markings 635*b*, 635*c*, and 635*d* are retained because the markings 635*b*, 635*c*, and 635*d* all represent states in which the tasks 620*c* and 620*d* are enabled.

In some implementations, the similarity measures may include the average number of steps that a token passes along the shortest path in a graphical representation of the workflow having places and tasks as vertices and transitions as edges. In some implementations, the similarity measures may include a weighting of the average steps similarity measure and the congruency of enabled states similarity measure. For example, the result of the congruency of enabled tasks measure may be assigned a score or a weight rather than a size. In another example, a score for the average steps similarity measure may be determined by assigning a weight to each transition and then summing the weights of the transitions to determine the preferred marking (perhaps the marking that results in the lowest score). In some implementations, a hybrid similarity measure may be determined based on a combination of the congruency of enabled tasks similarity measure and the average steps similarity measure. For example, a weighted sum of the results of each approach may be used as the similarity measure. One or more possible preferred markings are selected based on the similarity measure. In some implementations, if more than one remaining filtered marking remains after the similarity measure is applied, the preferred marking may be determined based on whether any of the remaining filtered markings represent states that have already occurred while the workflow was executing. If more than one of the remaining filtered markings has already occurred, the marking that occurred most recently may be selected as the preferred marking.

If more than one marking remains after applying the similarity measures, the remaining filtered markings may be analyzed further to determine which of the markings to select as the single preferred marking. In some implementations, the marking that enables the most tasks is selected as the preferred marking. The filtered markings determined above all enable two tasks; thus, the filtered markings in this example would have the same ranking using this criterion. However, the tasks could be weighted such that enabling certain tasks in the workflow would result in the appearance of additional or fewer tasks being enabled. For example, a marking that enables a task requiring three input tokens to be enabled may be weighted more highly than a marking that enables a task requiring one input token to be enabled. In some implementations, the markings may be analyzed to determine a number of tokens that the marking realizes, and the marking with the highest number of overall tokens may be selected as the preferred marking. Continuing with the above example, the markings 635*b* includes four tokens, while the markings 635*c* and 635*d* include three tokens. Thus, in this example the marking 635*b* would be selected as the preferred marking.

A single preferred marking is selected. If more than one possible preferred marking remains, the single preferred marking is selected at random, by first-in-first out, or by some other process from the possible preferred markings. In some implementations, one or more of the criteria discussed above is applied to the possible preferred markings until the single preferred marking remains.

Returning to FIG. 4, once the single preferred marking is selected, the simulated workflow may be generated based on the single preferred marking. The state of the simulated workflow is the state of the workflow that the single preferred marking represents, and the state represents a state in which the selected non-enabled task is enabled. The simulated workflow may be a clone of an actual workflow from which the user selected a non-enabled task to which to jump (such as the workflow 115 discussed with respect to FIG. 1). In either case, to enable the user to navigate through the simulated workflow, the state of the actual workflow is transformed to the state represented by the single preferred marking. The single preferred marking also may be referred to as the target marking, and the marking that represents the state of the workflow just before the jump to the non-enabled stated selected by the user may be referred to as the current marking. The tokens of the target marking that are consumed when the obligatory tasks fire are reserved and the tasks executing in the currently processed net are examined. All atomic tasks that are running are cancelled if the running tasks are not covered by the chosen marking. If running tasks are covered by the chosen marking, the required input tokens are removed from the currently processed marking. If a composite task is enabled in the state represented by the target marking, the tokens needed to fire the corresponding tasks are removed from the target marking. This allows subnets of the composite task to retain their current state. If the target marking does not enable the composite task, the composite task is cancelled along with the subnets of the composite task.

The state of the currently processed net (or workflow) is synchronized with the state represented by the target marking. The tokens that were reserved for firing the obligatory tasks are included through the synchronization, and the obligatory tasks are enabled and fired automatically. The jump to the selected non-enabled task is completed.

Figure 7:
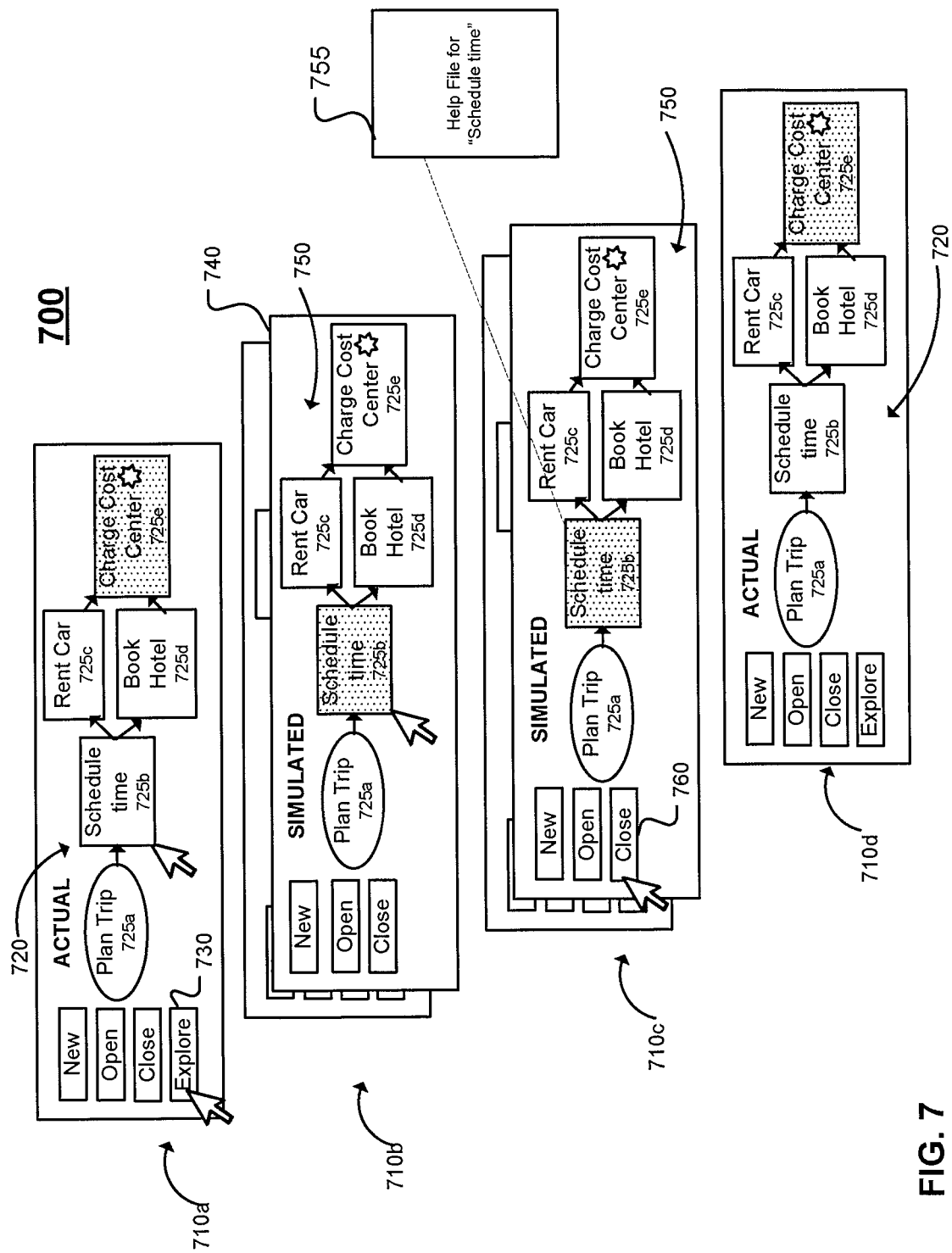
FIG. 7 shows an example interface for navigating in a workflow.

Referring to FIG. 7, an example user interface 700 is shown at four different times 700*a*-700*d*. In particular, the user interface 700 is shown at the four different times 700*a*-700*d* as a user selects a non-enabled task "Schedule time" 725*b* in a workflow 720. The workflow 720 shows a process for planning a trip and charging a cost center for expenses related to the trip, and the workflow 720 includes tasks 725*a*-725*e*. The user interface 700 may be similar to the user interface 110 discussed above with respect to FIG. 1.

At time 700*a*, the user selects a control "Explore" 730, which generates an additional interface 740. The additional interface 740 may pop up on top of the interface shown at time 700*a*, and the additional interface 740 may represent the interface 700 in a mode or setting that allows the user to explore the workflow 720. The additional interface 740 displays a simulated workflow 750 that allows the user to explore tasks of the workflow 740 without having to process tasks between a current working task and a selected non-enabled task "Schedule time" 725*b*.

In the example shown in FIG. 7, the task "Charge Cost Center" 725*e* is the current working task, and the user selects to jump to the non-enabled task "Schedule Time" 725*b*. As shown at the time 710*c*, through the simulated workflow 750, the user may view context-specific help 755 for the selected non-enabled task "Schedule time" 725*b*. The user may dismiss the additional interface 740 that displays the simulated workflow 750 by selecting a control "Close" 760 to close the additional interface 740. As shown at the time 710*d*, selecting to close the additional interface 740 allows the user to return to the workflow 720.

Figure 8:
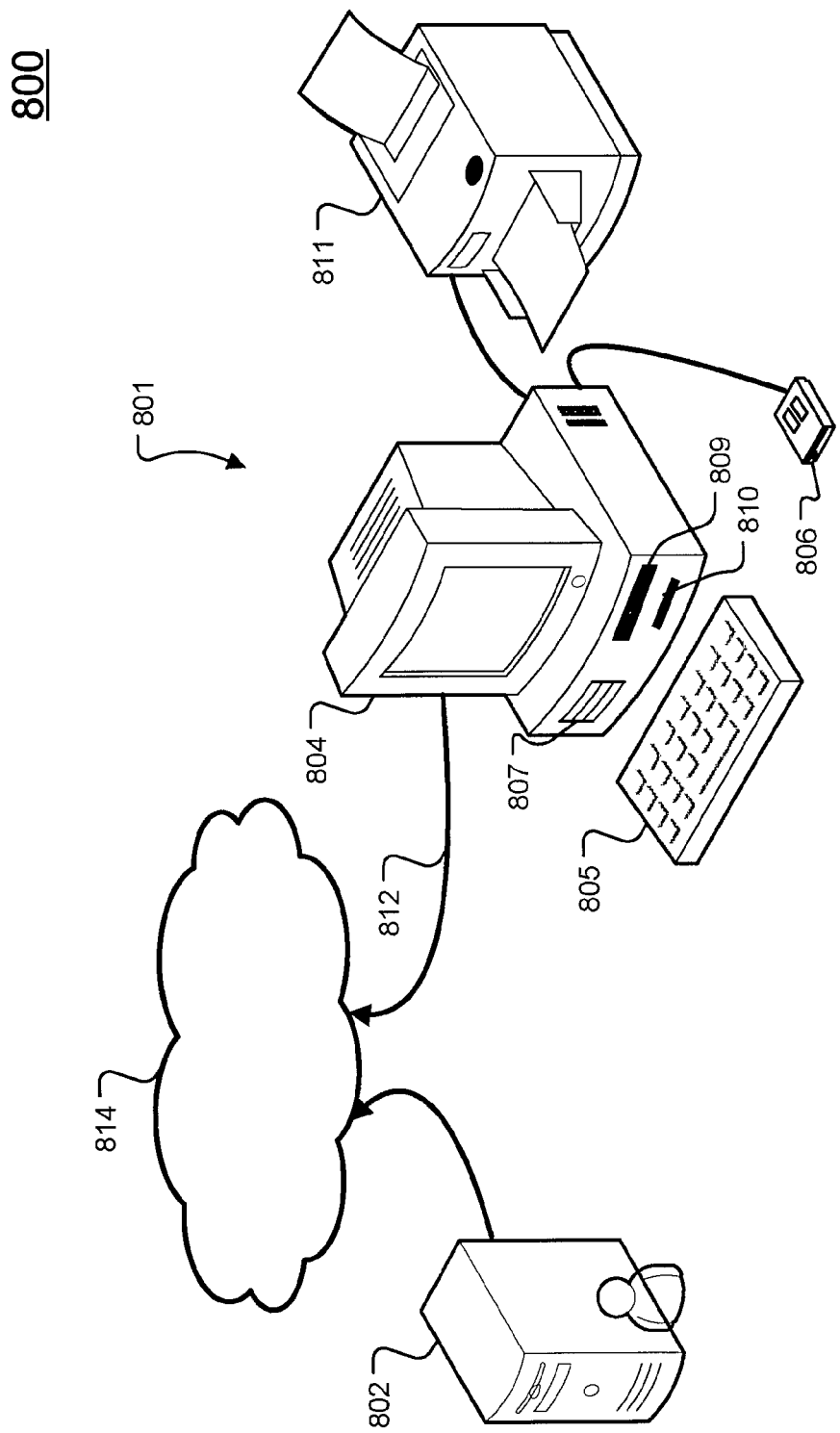
FIG. 8 illustrates the exterior appearance of an example system.

FIG. 8 illustrates the exterior appearance of an exemplary system 800 that implements the workflow navigation system, according to another general implementation. Briefly, the system 800 includes a device 801 that implements a workflow navigation system, and a server 802. As is described in more detail, below, the device 801 includes a processor, an interface, and an output module.

In more detail, the hardware environment of the device 801 includes a display monitor 804 for displaying text and images to a user, a keyboard 805 for entering text data and user commands into the device 801, a mouse 806 for pointing, selecting and adjusting objects displayed on the display monitor 804, a fixed disk drive 807, a removable disk drive 809, a tape drive 88, a hardcopy output device 811, and a computer network connection 812.

The display monitor 804 displays graphics, images, and text that include the display for the software applications used by the device 801, as well as the operating system programs necessary to operate the device 801. A user uses the keyboard 805 to enter commands and data to operate and control the computer operating system programs, the web browser, and/or the workflow navigation system. The user uses the mouse 806 to select and adjust graphics and text objects displayed on the display monitor 804 as part of the interaction with and control of the device 801 and applications running on the device 801. The mouse 806 is any type of pointing device, and may be a joystick, a trackball, a touch-pad, or other pointing device.

In a further implementation, the fixed disk drive 807 itself may include a number of physical drive units, such as a redundant array of independent disks ("RAID"), or may be a disk drive farm or a disk array that is physically located in a separate computing unit. Such computer readable memory media allow the device 801 to access computer-executable process steps, application programs and the like, stored on removable and non-removable memory media.

The wireless or wireline computer network connection 812 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 814 may be one or more of a LAN network, a corporate or government WAN network, the Internet, or other network.

The computer network connection 812 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 809 is a removable storage device that is used to off-load data from the device 801 or upload data onto the device 801. The removable disk drive 809 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 807 or on removable media for the removable disk drive 809.

The tape drive 810 is a tape storage device that is used to off-load data from the device 801 or to upload data onto the device 801. The tape drive 810 may be a quarter-inch cartridge ("QIC"), 4 mm digital audio tape ("DAT"), 8 mm digital linear tape ("DLT") drive, or other type of tape.

The hardcopy output device 811 provides an output function for the operating system programs and applications. The hardcopy output device 811 may be a printer or any output device that produces tangible output objects, including textual or image data or graphical representations of textual or image data. While the hardcopy output device 811 is depicted as being directly connected to the device 801, it need not be. For instance, the hardcopy output device 811 may be connected to device 801 via a network interface, such as a wireline or wireless network.

Furthermore, although the device 801 is illustrated in FIG. 8 as a desktop PC, in further implementations the device 801 may be a laptop, a workstation, a midrange computer, a mainframe, an embedded system, telephone, a handheld or tablet computer, a PDA, or other type of device that includes a data processing apparatus.

Figure 9:
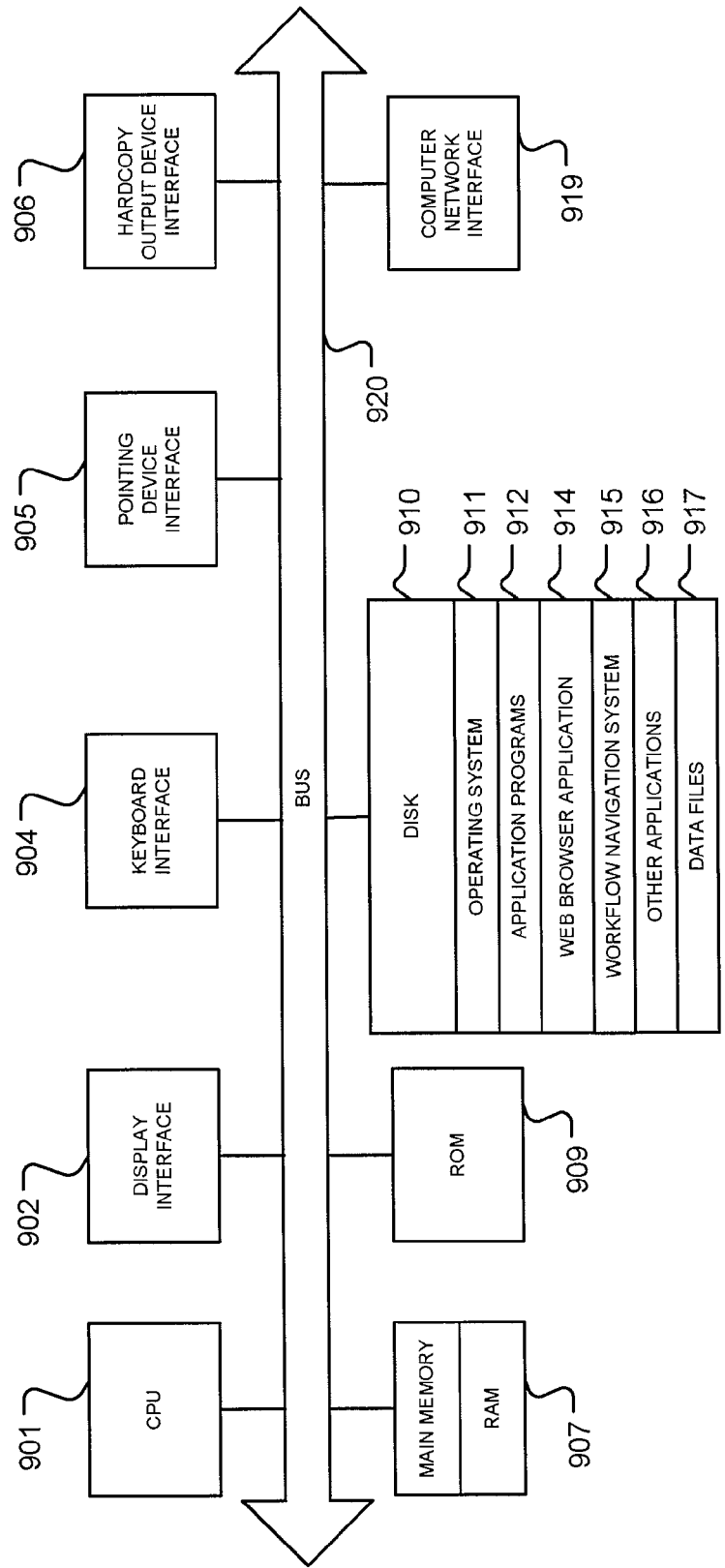
FIG. 9 is a block diagram illustrating the internal architecture of the system shown in FIG. 8.

FIG. 9 is a block diagram illustrating the internal architecture of one computer shown in FIG. 8. The computing environment includes a computer central processing unit ("CPU") 901 where the computer instructions that include an operating system or an application are processed; a display interface 902 which provides a communication interface and processing functions for rendering graphics, images, and texts on the display monitor 804; a keyboard interface 904 which provides a communication interface to the keyboard 805; a pointing device interface 905 which provides a communication interface to the mouse 806 or an equivalent pointing device; a hardcopy output device interface 906 which provides a communication interface to the hardcopy output device 811; a random access memory ("RAM") 907 where computer instructions and data are stored in a volatile memory device for processing by the computer CPU 901; a read-only memory ("ROM") 909 where invariant low-level systems code or data for basic system functions such as basic input and output ("I/O"), startup, or reception of keystrokes from the keyboard 805 are stored in a non-volatile memory device; a storage medium 910 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that include an operating system 911, application programs 912 (including web browser application 914, a workflow navigation system application 915, and other applications 916 as necessary) and data files 917 are stored; and a computer network interface 919 which provides a communication interface to the network 814 over the computer network connection 812. The constituent devices and the computer CPU 901 communicate with each other over the computer bus 920.

The RAM 907 interfaces with the computer bus 920 so as to provide quick RAM storage to the computer CPU 901 during the execution of software programs such as the operating system application programs, and device drivers. More specifically, the computer CPU 901 loads computer-executable process steps from the fixed disk drive 807 or other media into a field of the RAM 907 in order to execute software programs. Data is stored in the RAM 907, where the data is accessed by the computer CPU 901 during execution.

Also shown in FIG. 9, the device 801 stores computer-executable code for a operating system 911, and application programs 912 such as word processing, spreadsheet, presentation, gaming, web browsing, JavaScript engine, or other applications.

The computer CPU 901 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 901 is more than one processing unit, including a multiple CPU configuration found in high-performance workstations and servers, or a multiple scalable processing unit found in mainframes.

The operating system 911 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 911 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 8 and 9 illustrate one possible implementation of a computing system that executes program code, or program or process steps, configured to implement a workflow navigation system, other types of computers may also be used as well.

Although the term "user" has been consistently used to describe an entity that interacts with these processes, such a generalization is also intended to describe multiple related or unrelated, living or automated entities or beings that interact with these processes at various different, overlapping or non-overlapping states.

Similarly, the term "selection" is intended to denote throughout a manual selection by a human, an automatic selection by a non-human, or some combination thereof. Finally, it is noted that, for the sake of brevity, the terms "Java" and "JavaScript" are intended to reference the SUN MICROSYSTEMS® JAVASCRIPT® programming language, and the term "XML" is intended to reference 'eXtensible Markup Language' throughout.

A number of implementations have been described. Nevertheless, it will be understood that various modifications may be made without departing from the scope of the disclosure. Accordingly, other implementations are within the scope of the following claims.

What is claimed is:

1. A computer-implemented method comprising:
providing, for display in a user interface, an actual workflow, the actual workflow being associated with a first workflow state and being expressed as a Petri net, the actual workflow comprising a first set of enabled tasks and non-enabled tasks, where each enabled task is provided as a task comprising tokens in all input places, and each non-enabled task is provided as a task comprising at least one absence of a token from an input place;
identifying a task as a selected task that has been selected by a user using the user interface;
determining that the selected task is a non-enabled task, and in response:
determining a path from a current task to the selected task in the actual workflow,
identifying a second workflow state in which the selected task is enabled based on the path, and
generating a simulated workflow for the selected task based on the second workflow state, the simulated workflow comprising a second set of enabled tasks and non-enabled tasks that is different from the first set of enabled tasks and non-enabled tasks;
providing the simulated workflow for display on the user interface; and
enabling the user to navigate through the simulated workflow.

2. The method of claim 1, wherein identifying the second workflow state comprises:
identifying a plurality of suitable workflow states, in each of which the selected task is enabled;
identifying obligatory tasks from among the non-enabled tasks;
filtering the plurality of suitable workflow states into filtered workflow states, the filtered workflow states excluding suitable workflow states that fail to enable at least one obligatory task; and
determining a preferred workflow state from the filtered workflow states, the second workflow state being the preferred workflow state.

3. The method of claim 2, further comprising identifying a current marking representing a current state of the workflow associated with the enabled task.

4. The method of claim 3, wherein determining a preferred workflow state comprises:
identifying a plurality of possible preferred workflow states;
determining a similarity measure between the current marking and a target marking representing a workflow state that enables the selected non-enabled task; and
selecting the preferred workflow state from among the plurality of possible preferred workflow states based on the similarity measure.

5. The method of claim 4, wherein the similarity measure comprises determining an intersection between tasks enabled in a state of the workflow represented by the current marking and tasks enabled in a target state of the workflow represented by the target marking.

6. The method of claim 4, wherein the similarity measure comprises a number of tasks between the enabled task accessed by the user and the selected task.

7. The method of claim 4 further comprising selecting the preferred workflow state at random from among the plurality of possible preferred workflow states.

8. The method of claim 5, wherein determining the intersection between tasks enabled based on the current marking and tasks enabled in the target marking comprises determining a number of tasks enabled in both the current workflow state and the target state of the workflow.

9. The method of claim 5, wherein more than one possible preferred workflow state has the same intersection and the similarity measure further comprises determining a most recently simulated possible preferred workflow state, and selecting the most recently simulated possible preferred workflow state as the preferred workflow state.

10. The method of claim 1, wherein one or more of the enabled tasks and the non-enabled tasks are associated with context-specific help, and the context-specific help is accessible through the simulated workflow.

11. The method of claim 1, wherein enabling the user to navigate through the simulated workflow further comprises jumping to the selected task without performing tasks between the enabled task accessed by the user and the selected task.

12. The method of claim 1, wherein the user interface enables the user to navigate through the simulated workflow.

13. The method of claim 1, further comprising:
  identifying a second selected task selected by the user in the simulated workflow; and
  determining that the second selected task is a non-enabled task, and in response:
    identifying a third workflow state, in which the second selected task is enabled;
    generating a second simulated workflow based on the third workflow state; and
    enabling the user to navigate through the second simulated workflow.

14. The method of claim 1, wherein:
  each of the enabled and non-enabled tasks includes one or more inputs, and
  the one or more inputs of the enabled tasks includes at least one token.

15. A computer program product, tangibly embodied in a non-transitory machine-readable medium, the computer program product comprising instructions that, when read by a machine, operate to cause a data processing apparatus to:
  provide, for display in a user interface, an actual workflow, the actual workflow being associated with a first workflow state and being expressed as a Petri net, the actual workflow comprising a first set of enabled tasks and non-enabled tasks, where each enabled task is provided as a task comprising tokens in all input places, and each non-enabled task is provided as a task comprising at least one absence of a token from an input place;
  identify a task as a selected task that has been selected by a user using the user interface;
  determine that the selected task is a non-enabled task, and in response:
    determining a path from a current task to the selected task in the actual workflow,
    identifying a second workflow state in which the selected task is enabled based on the path, and
    generating a simulated workflow for the selected task based on the second workflow state, the simulated workflow comprising a second set of enabled tasks and non-enabled tasks that is different from the first set of enabled tasks and non-enabled tasks;
  provide the simulated workflow for display on the user interface; and
  enable the user to navigate through the simulated workflow.

16. The computer program product of claim 15, wherein the instructions to identify the second workflow state further comprise instructions that, when read by a machine, operate to cause a data processing apparatus to:
  identify a plurality of suitable workflow states, in each of which the selected task is enabled;
  identify obligatory tasks from among the non-enabled tasks;
  filter the plurality of suitable workflow states into filtered workflow states, the filtered workflow states excluding suitable workflow states that fail to enable at least one obligatory task; and
  determine a preferred workflow state from the filtered workflow states, the second workflow state being the preferred workflow state.

17. The computer program product of claim 15, wherein identifying an enabled task accessed by a user in a workflow comprises identifying a current marking representing a current state of the workflow associated with the enabled task.

18. The computer program product of claim 17, wherein the instructions to identify a plurality of suitable workflow states further comprise instructions that, when read by a machine, operate to cause a data processing apparatus to:
  identify a plurality of possible preferred workflow states;
  determine a similarity measure between the current marking and a target marking representing a state of the workflow that enables the selected non-enabled task; and
  select the preferred workflow state from among the plurality of possible preferred workflow states based on the similarity measure.

19. A device comprising:
  a processor configured to:
    provide, for display in a user interface, an actual workflow, the actual workflow being associated with a first workflow state and being expressed as a Petri net, the actual workflow comprising a first set of enabled tasks and non-enabled tasks, where each enabled task is provided as a task comprising tokens in all input places, and each non-enabled task is provided as a task comprising at least one absence of a token from an input place,
    identify a task as a selected task that has been selected by the user using the user interface,
    determine that the selected task is a non-enabled task, and in response:
      determining a path from a current task to the selected task in the actual workflow,
      identifying a second workflow state in which the selected task is enabled based on the path, and
      generating a simulated workflow for the selected task based on the second workflow state, the simulated workflow comprising a second set of enabled tasks and non-enabled tasks that is different from the first set of enabled tasks and non-enabled tasks;
    provide the simulated workflow for display on a user interface, and
    enable the user to navigate through the simulated workflow; and
  a repository configured to:
    store the selected task, and
    transmit the selected task to the processor.

20. The device of claim 19 further comprising:
  an interface generation module configured to:
    display the actual workflow, and
    display the simulated workflow in response to the selection of the selected task.

* * * * *